United States Patent [19]

Gunkel

[11] Patent Number: 5,670,126
[45] Date of Patent: Sep. 23, 1997

[54] METHOD FOR EXTRACTING ANTIMONY FROM ELEMENTAL PHOSPHORUS

[75] Inventor: Louis T. Gunkel, Yardley, Pa.

[73] Assignee: FMC Corporation, Philadelphia, Pa.

[21] Appl. No.: 596,815

[22] Filed: Feb. 5, 1996

[51] Int. Cl.$^6$ .................................................. C01B 25/01
[52] U.S. Cl. ............................................................. 423/322
[58] Field of Search .................................... 423/322, 87

[56] References Cited

FOREIGN PATENT DOCUMENTS

| | | | |
|---|---|---|---|
| 5-43210 | 2/1993 | Japan | ........ 423/322 |
| 06040710 A | 2/1994 | Japan . | |
| 1648899 A1 | 5/1991 | U.S.S.R. . | |

*Primary Examiner*—Steven Bos
*Attorney, Agent, or Firm*—Anthony L. Cupoli

[57] ABSTRACT

A process for purifying elemental phosphorus, by dosing a multi-phase elemental phosphorus system, having an aqueous phase and an immiscible, elemental phosphorus phase containing antimony, with a conditioning agent selected from the group consisting of iron (II) salt or iron (III) salt with free iodine; iron (II) iodide; free iodine; iron (II) sulfate; or iron (III) sulfate in an amount effective to lower the amount of antimony in the phosphorus; agitating the resultant mixture at a temperature above the melting point of phosphorus, but below the boiling point of water, and then separating the aqueous phase from the phosphorus phase to recover a phosphorus lower in antimony content.

20 Claims, No Drawings

METHOD FOR EXTRACTING ANTIMONY FROM ELEMENTAL PHOSPHORUS

FIELD OF THE INVENTION

This invention relates to the removal of heavy metals from elemental phosphorus. More particularly, it concerns the removal of antimony.

BACKGROUND OF THE INVENTION

Elemental phosphorus contains metals such as iron, arsenic, chromium, zinc, and antimony in the parts per million level. The extent to which these metals are present in the phosphorus depends on the source of the phosphate ore that the phosphorus is made from and, to some extent, on the overall process used to produce and refine the elemental phosphorus. Of these metals, antimony has been most difficult to remove on an economical basis. Since a high antimony content can make the phosphorus unacceptable to use in certain food and electronics applications, it is important to develop such a basis. To date, there has been no publicly known, economical method for doing so. The known technology is too costly to be used for certain food and electronics applications.

This problem is perpetuated when elemental phosphorus is converted into phosphoric acid because the arsenic and antimony in the phosphorus carry over into the phosphoric acid and must be dealt with there. Although arsenic can be removed effectively from phosphoric acid by sulfiding, this is not true for antimony. Thus, in high value phosphoric acid products such as food grade acid and semiconductor grade acid, antimony can be a problem.

There are two pertinent references, and neither teaches the removal of antimony. Instead, both teach the removal of another heavy metal: arsenic. These two references are, as follows:

Russian patent application SU 1648899 A1, published May 15, 1991, teaches that arsenic can be removed from elemental phosphorus having a high content of arsenic, organics, and insoluble residue, if the impure phosphorus is treated with an aqueous solution of the salt of trivalent iron at a mass ratio of $Fe^{+3}$ to As equal to 40–80 at 55°–85° C. for a period of 3–5 hours with stirring. This publication teaches that, under the cited conditions, an elemental phosphorus having 0.023% (230 PPM) arsenic before treatment has 0.003 (30 PPM) arsenic after treatment. The only iron salts exemplified are ferric chloride and ferric sulfate.

Japanese patent application JP 06040710 A, published Jul. 21, 1992, teaches that iodine oxide, an iodate compound, can be added to crude yellow phosphorus and reacted with the arsenic in the phosphorus. Arsenic oxide, the reaction product, has a higher boiling point than phosphorus, which can be distilled off leaving the arsenic oxide behind. The application teaches the reduction of arsenic levels from 61 PPM to 2.1 PPM. It is known that distillation alone can do the same.

The chemical processes reported to date have been either too expensive or non-instructive. On the one hand, the process of JP 06040710 A is extremely expensive because the phosphorus is removed from the arsenic by distillation, a process which requires high energy expenditures and elaborate equipment. On the other hand, the process of SU 1648899 A1 is not operable. As shown, herein, the results cannot be reproduced. Efforts to do so have demonstrated that the process has no or little effect on the removal of arsenic. Examples 1, 2 and 3 listed herein demonstrate no reduction in the amount of arsenic, since the 5% reduction of Example 2 is, in fact, within the normal experimental/analytical deviation. These results lie in stark contrast to the 90% reduction described in that application. In view of that discrepancy, that application would not be looked to for teaching the removal of arsenic. Moreover, since the only metal exemplified, arsenic, cannot be removed by the process described, one would not look to that teaching for the removal of any other metal.

The lack of clear direction coupled with misdirection has made it difficult to find a cost effective method for removing antimony from elemental phosphorus. Surprisingly, such a cost effective method has been found.

SUMMARY

In accordance with the present invention, it has been discovered that elemental phosphorus can be purified, by dosing a multiphase elemental phosphorus system, having an aqueous phase and an immiscible, elemental phosphorus phase containing antimony, with a conditioning agent selected from the group consisting of an iron (II) salt or iron (III) salt with free iodine; iron (III) iodide; free iodine; iron (II) sulfate; or iron (III) sulfate, in an amount effective to lower the concentration of antimony in the phosphorus; agitating the resultant mixture at a temperature above the melting point of phosphorus, but below the boiling point of water, and then separating the aqueous and phosphorus phases to recover a phosphorus lower in antimony content.

DETAILED DESCRIPTION

Elemental phosphorus has many allotropic forms. The phosphorus of this invention, commonly termed "elemental phosphorus" has a melting point of about 44.1° C. and a boiling point of about 280.5° C. In text books, it is sometimes called white phosphorus, because that is the color of the purified element. But, in the industry, it is commonly called yellow phosphorus, as that is, typically, the color of the industrially pure form.

Elemental phosphorus reacts spontaneously with air. Although phosphorus contact with air can be avoided by keeping the phosphorus in a vacuum or under an inert gas blanket, air contact is typically avoided through the use of a water blanket. Because water is immiscible with, and less dense than phosphorus, it forms in a quiescent state a protective aqueous layer above the phosphorus that serves as an effective, economical, interface that precludes air/phosphorus contact.

Antimony is intimately associated with the elemental phosphorus in the phosphorus phase. Although the exact manner in which antimony is bound to the phosphorus is unknown, it is connected in a manner that prevents the separation of the antimony and the phosphorus through mere water extraction. The conditioning agents of this invention, on the other hand, tend to be water soluble; albeit sometimes to only a very limited extent. Although these conditioning agents can be added to the phosphorus system in solid form, or as an aqueous solution, it is expected that the conditioning agents start out in one phase, while the antimony starts out in the other.

Because the conditioning agent and the antimony begin in different phases, the likelihood of conditioning occurring based on mere addition of the conditioning agent to the antimony is expected to be extremely low. This likelihood is further lowered by the fact that the antimony is present in extremely small amounts, on a parts per million scale. Because of these factors, the likelihood of an effective, conditioning contact between the conditioning agent and the antimony containing phosphorus is, thus, extremely low, absent some other factor.

It has been determined that there are steps that can be taken to increase the likelihood of effective conditioning contact. One of these is to increase the level of agitation of the phosphorus system. Except where conditioning occurs in a vacuum or under an inert gas blanket, the degree of agitation should be limited by the need to prevent phosphorus from coming into contact with the air, where it will react. Such a reaction would lower the yield of the phosphorus, producing unwanted side products, and could put the plant, the equipment and the personnel involved at risk.

Another step that can be taken is to increase the dosage of the conditioning agent to increase the effectiveness of the conditioning process by increasing the probability of contact of the conditioning agent with the phosphorus phase. Although some of the conditioning agents may act as catalysts, and may not be needed on a stoichiometric basis, it is generally desirable to have an excess of conditioning agent relative to the antimony. Thus, whether the conditioning reaction, in fact, is on a stoichiometric basis or not, the conditioning agent is preferably used in an excess amount.

Another step is to control the temperature of the phosphorus system during the conditioning and purification process. Since phosphorus melts at 44.1° C., the lower range of the mixing temperature must be above this temperature. In order to keep the water from boiling off, the upper temperature should not be above the boiling point of water. A reasonable mixing temperature is within the range of from 47°–87° C. However, the preferred operating range is 55°–70° C.

As used herein, the term stoichiometric basis is used merely for the convenience of providing a terminology for suggesting the amount of conditioning agent to be used, but not to suggest that the conditioning itself is on a stoichiometric basis. Although substoichiometric amounts may work, for the reasons presented above, each of the conditioning agents is used in a conditioning agent to antimony ratio of preferably about 1:1 or greater; and more preferably about 10:1 or greater, even more 50:1 or greater, and most preferably 100:1 or greater. As the excess of conditioning agent increases, as evidenced by the higher ratio, the more quickly and more completely the degree of conditioning will be. Assuming adequate dosing of conditioning agent, and sufficient agitation, conditioning is normally completed within 0.5 to 5 hours.

However, the size of these ratios is, on a practical basis, tempered by the need to avoid waste of conditioning agent on the one hand, as well as by the need to stay within reasonable processing time limits, on the other. Normal laboratory scale testing can be used to determine the best ratio for any given system. As demonstrated in the examples, a molar ratio of iron to antimony of 60:1 together with an iodine to antimony molar ratio of 15:1 has been found suitable for conditioning the phosphorus system within only 3–5 hours.

Although the general ratios of conditioning agent to antimony provided above are suitable for use with all the conditioning agents, in some instances, the dosing parameters for individual conditioning agents may be further optimized, as described below.

Because of its low solubility in water, iodine might have been expected to be a limiting factor in the removal of antimony; however, in practice that has not been the case. But it is necessary to use sufficient free iodine to facilitate the conditioning process for the removal of the antimony. To maximize removal, the iodine is used on an iodine to antimony ratio of 1:1 or greater, and preferably on a ratio of 5:1 or greater, whether used alone as the sole conditioning agent, or used in conjunction with another conditioning agent.

Iron (II) salts and/or iron (III) salts are preferrably used in an iron (II) and/or iron (III) to antimony ratio of 1:1 or greater. Again, because of the low amounts antimony as an impurity, a dosage of about 20:1 or greater is preferred. Generally, any source of water soluble iron (II) or iron (III) can be used. The iodide, chloride, and sulfate salts have been demonstrated in this specification. The only salt that is known not to work well in the absence of iodide or iodine is the chloride salt. Iron (II) iodide can be used alone or with the addition of free iodine. When used without the addition of free iodine, it can be dosed on a iron to antimony basis of 1:1 or greater, but it is preferably dosed on a basis of 5:1 or greater. When the iron iodide is used with free iodine, the dosages are determined on the basis of using an iron salt and free iodine, as described above.

Upon completion of the conditioning process, the phosphorus and the antimony can be separated by separating the water phase from the phosphorus phase. This is best achieved by reducing agitation sufficiently to allow the two phases to form separate layers. Then, the water can be removed from the phosphorus by allowing it to flow over a weir, or by using a siphoning device. Alternatively, the phosphorus can be drained from below the water layer. Generally, a gravity separation is preferred.

An added benefit of the process of this invention is the high yield of purified phosphorus. In fact, there is almost no loss of phosphorus as a result of the purification process of this invention. In the experiments conducted herein, the phosphorus recovery after purification was greater than 99 percent. This is in contrast with the other extraction processes, such as the nitric acid process for extracting arsenic, which results in elemental phosphorus loses of about 15 percent.

The following examples are intended as a further illustration of the invention, but not as a limitation on the scope of the invention. All parts and percentages in the examples, and throughout this specification and claims, are by weight; all temperatures are in degrees centigrade; and all ratios of ingredients are on a stoichiometric basis, unless otherwise indicated.

First however, a brief summary of these examples is provided as follows:

Neither iron (III) chloride nor iron (III) sulfate alone lowers the arsenic level in elemental phosphorus, as touted by SU 1648899 A1. Instead, the percent reductions are as follows: Example 1 (0%), Example 2 (5%) and Example 3 (0%).

In the examples of this invention, iron (III) sulfate demonstrates a significant reduction in the amount of antimony in elemental phosphorus. The percent reduction is as follows: Example 7 (68%). Thus iron (III) sulfate, alone, can be used to reduce antimony levels in phosphorus.

Significantly, iron (II) sulfate, alone, results in a significant reduction in the amount of antimony in elemental phosphorus. The percent reduction is as follows: Example 6 (57%). Thus, Examples 6 and 7 demonstrate that either iron (II) sulfate or iron (III) sulfate alone, or in combination, can be used to lower the amount of antimony in phosphorus.

Free iodine, alone, results in a significant reduction in the amount of antimony in elemental phosphorus. The percent reductions are as follows: Example 4 (53%) and Example 5 (60%).

Iron (III) chloride when used with free iodine has a significant impact on lowering antimony levels in elemental phosphorus. The percent reductions are as follows: Example 8 (94.9%), Example 9 (94.9%), Example 10 (97%), Example 11 (94.9%).

Iron (II) iodide also has a significant impact on lowering the antimony levels in elemental phosphorus. The percent reduction is as follows: Example 12 (94.5%).

It is likely that the concentration of other heavy metals in the phosphorus may be reduced as a result of this process. In Example 13, the treated phosphorus was analyzed for other heavy metals and the results indicate that there is also a reduction in the amount of aluminum, lead, and zinc concentrations in the phosphorus.

EXAMPLES OF THE PRIOR ART

Example 1

Extracting with iron (III) chloride only

Eighty grams of deionized water and 20.3 grams of a 10% solution of $FeCl_3$ were added to a 200 ml beaker and stirred and heated to 50° C. in a water bath. When the solution reached temperature, 50.5 grams of elemental phosphorus were added and allowed to mix for five hours at temperature. After five hours the stirring was stopped and the aqueous and phosphorus layers separated. The phosphorus was cooled to freezing (30° C.) and the aqueous phase was drawn off. The phosphorus was then washed with deionized water at 50° C. for thirty minutes and then removed and analyzed.

| Analysis of phosphorus before treatment | 200 PPM arsenic |
|---|---|
| Analysis of phosphorus after treatment | 200 PPM arsenic |

Example 2

Extracting with iron (III) chloride only

Eighty grams of deionized water and 20.3 grams of a 10% solution of $FeCl_3$ were added to a 200 ml beaker and stirred and heated to 60° C. in a water bath. When the solution reached temperature, 50.0 grams of elemental phosphorus were added and allowed to mix for three hours at temperature. After three hours the stirring was stopped and the aqueous and phosphorus layers separated. The phosphorus was cooled to freezing (30° C.) and the aqueous phase was drawn off. The phosphorus was then washed with deionized water at 50° C. for thirty minutes and then removed and analyzed.

| Analysis of phosphorus before treatment | 200 PPM arsenic |
|---|---|
| Analysis of phosphorus after treatment | 190 PPM arsenic |

Example 3

Extracting with iron (III) sulfate

Eighty grams of deionized water and 20.3 grams of a 10% solution of $Fe_2(SO_4)_3$ were added to a 200 ml beaker and stirred and heated to 60° C. in a water bath. When the solution reached temperature, 40.0 grams of elemental phosphorus were added and allowed to mix for four hours at temperature. After four hours the stirring was stopped and the aqueous and phosphorus layers separated. The phosphorus was cooled to freezing (30° C.) and the aqueous phase was drawn off. The phosphorus was then washed with deionized water at 50° C. for thirty minutes and then removed and analyzed.

| Analysis of phosphorus before treatment | 200 PPM arsenic |
|---|---|
| Analysis of phosphorus after treatment | 200 PPM arsenic |

EXAMPLES OF THE INVENTION

Example 4

Extracting with iodine only

One hundred grams of a saturated iodine solution were added to a 200 ml beaker, stirred at 300 rpm and heated to 60° C. in a water bath. When the solution reached temperature, 40.0 grams of elemental phosphorus were added and allowed to mix for four hours at temperature. After four hours the stirring was stopped and the aqueous and phosphorus layers separated. The phosphorus was cooled to freezing (30° C.) and the aqueous phase was drawn off. The phosphorus was then washed with deionized water at 50° C. for thirty minutes and then removed and analyzed.

| Analysis of phosphorus before treatment | 47 PPM arsenic |
|---|---|
| Analysis of phosphorus after treatment | 22 PPM arsenic |

Example 5

Extracting with iodine only

One hundred grams of a saturated iodine solution were added to a 200 ml beaker, stirred at 300 rpm and heated to 60° C. in a water bath. When the solution reached temperature, 40.0 grams of elemental phosphorus were added and allowed to mix for four hours at temperature. After four hours the stirring was stopped and the aqueous and phosphorus layers separated. The phosphorus was cooled to freezing (30° C.) and the aqueous phase was drawn off. The phosphorus was then washed with deionized water at 50° C. for thirty minutes and then removed and analyzed.

| Analysis of phosphorus before treatment | 47 PPM antimony |
|---|---|
| Analysis of phosphorus after treatment | 19 PPM antimony |

Example 6

Extracting with iron (II) sulfate only

Eighty grams of deionized water and 20.3 grams of a 10% solution of $FeSO_4$ were added to a 200 ml beaker and stirred and heated to 60° C. in a water bath. When the solution reached temperature, 41.0 grams of elemental phosphorus were added and allowed to mix for four hours at temperature. After four hours the stirring was stopped and the aqueous and phosphorus layers separated. The phosphorus was cooled to freezing (30° C.) and the aqueous phase was drawn off. The phosphorus was then washed with deionized water at 50° C. for thirty minutes and then removed and analyzed.

| Analysis of phosphorus before treatment | 47 PPM antimony |
|---|---|
| Analysis of phosphorus after treatment | 20 PPM antimony |

Example 7

Extracting with iron (III) sulfate

Eighty grams of deionized water and 20.3 grams of a 10% solution of $Fe_2(SO_4)_3$ were added to a 200 ml beaker and stirred and heated to 60° C. in a water bath. When the solution reached temperature, 40.0 grams of elemental phosphorus were added and allowed to mix for four hours at temperature. After four hours the stirring was stopped and the aqueous and phosphorus layers separated. The phosphorus was cooled to freezing (30° C.) and the aqueous phase was drawn off. The phosphorus was then washed with deionized water at 50° C. for thirty minutes and then removed and analyzed.

| Analysis of phosphorus before treatment | 47 PPM antimony |
|---|---|
| Analysis of phosphorus after treatment | 15 PPM antimony |

Example 8

Extracting with iron (III) chloride and iodine

Eighty grams of deionized water, 20.3 grams of a 10% solution of $FeCl_3$, and 0.3 grams of iodine were added to a 200 ml beaker and stirred and heated to 60° C. in a water bath. When the solution reached temperature, 51.0 grams of elemental phosphorus were added and allowed to mix for four hours at temperature. After four hours the stirring was stopped and the aqueous and phosphorus layers separated. The phosphorus was cooled to freezing (30° C.) and the aqueous phase was drawn off. The phosphorus was then washed with deionized water at 50° C. for thirty minutes and then removed and analyzed.

| Analysis of phosphorus before treatment | 47 PPM antimony |
|---|---|
| Analysis of phosphorus after treatment | 2.4 PPM antimony |

Example 9

Extracting with iron (III) chloride and iodine

Eighty grams of deionized water, 20.3 grams of a 10% solution of $FeCl_3$, and 0.3 grams of iodine were added to a 200 ml beaker and stirred and heated to 60° C. in a water bath. When the solution reached temperature, 40.0 grams of elemental phosphorus were added and allowed to mix for four hours at temperature. After four hours the stirring was stopped and the aqueous and phosphorus layers separated. The phosphorus was cooled to freezing (30° C.) and the aqueous phase was drawn off. The phosphorus was then washed with deionized water at 50° C. for thirty minutes and then removed and analyzed.

| Analysis of phosphorus before treatment | 47 PPM antimony |
|---|---|
| Analysis of phosphorus after treatment | 2.4 PPM antimony |

Example 10

Extracting With iron (III) chloride and iodine

Eighty grams of deionized water, 20.3 grams of a 10% solution of $FeCl_3$, and 0.3 grams of iodine were added to a 200 ml beaker and stirred and heated to 60° C. in a water bath. When the solution reached temperature, 40.9 grams of elemental phosphorus were added and allowed to mix for four hours at temperature. After four hours the stirring was stopped and the aqueous and phosphorus layers separated. The phosphorus was cooled to freezing (30° C.) and the aqueous phase was drawn off. The phosphorus was then washed with deionized water at 50° C. for thirty minutes and then removed and analyzed.

| Analysis of phosphorus before treatment | 47 PPM antimony |
|---|---|
| Analysis of phosphorus after treatment | 1.4 PPM antimony |

Example 11

Extracting With iron (III) chloride and iodine

Eighty grams of deionized water, 20.3 grams of a 10% solution of $FeCl_3$, and 0.3 grams of iodine were added to a 200 ml beaker and stirred and heated to 60° C. in a water bath. When the solution reached temperature, 39.7 grams of elemental phosphorus were added and allowed to mix for three hours at temperature. After three hours the stirring was stopped and the aqueous and phosphorus layers separated. The phosphorus was cooled to freezing (30° C.) and the aqueous phase was drawn off. The phosphorus was then washed with deionized water at 50° C. for thirty minutes and then removed and analyzed. The weight of phosphorus remaining after the treatment was 39.5 grams indicating a 99.7 percent recovery.

| Analysis of phosphorus before treatment | 47 PPM antimony |
|---|---|
| Analysis of phosphorus after treatment | 2.4 PPM antimony |

Example 12

Extracting With iron (II) iodide

One hundred grams of a 2% ferric iodide ($FeI_2 \cdot H_2O$) solution were added to a 200 ml beaker and stirred and heated to 60° C. in a water bath. When the solution reached temperature, 38.0 grams of elemental phosphorus were added and allowed to mix for three hours at temperature. After three hours the stirring was stopped and the aqueous and phosphorus layers separated. The phosphorus was cooled to freezing (30° C.) and the aqueous phase was drawn off. The phosphorus was then washed with deionized water at 50° C. for thirty minutes and then removed and analyzed.

| Analysis of phosphorus before treatment | 47 PPM antimony |
|---|---|
| Analysis of phosphorus after treatment | 2.6 PPM antimony |

Example 13

Extracting with iron (III) chloride and iodine

Eighty grams of deionized water, 20.3 grams of a 10% solution of $FeCl_3$, and 0.3 grams of iodine were added to a 200 ml beaker and stirred and heated to 60° C. in a water bath. When the solution reached temperature, 40.3 grams of elemental phosphorus were added and allowed to mix for three hours at temperature. After three hours the stirring was stopped and the aqueous and phosphorus layers separated. The phosphorus was cooled to freezing (30° C.) and the aqueous phase was drawn off. The phosphorus was washed with deionized water at 50° C. for thirty minutes and then removed. Phosphorus recovered was 40.0 grams, with a recovery of better than 99 percent. The product was analyzed and compared with the analysis of the phosphorus before the extraction.

| Element | Starting Phosphorus | Phosphorus After Extraction |
| --- | --- | --- |
| Aluminum | 1.6 PPM | <1 PPM |
| Cadmium | 15 PPM | 13 PPM |
| Chromium | <1 PPM | <1 PPM |
| Lead | 0.13 PPM | <0.1 PPM |
| Antimony | 20 PPM | 2.0 PPM |
| Silicon | <5 PPM | <5 PPM |
| Zinc | 4.8 PPM | <1 PPM |

From this example it can be seen that threre is a significant reduction in the antimony level (90%) as we had observed before. In addition, there appears to be a reduction in the aluminum, lead and zinc levels in the product as well.

Example 14

Reducing the amount of extractants in the solution

Ninety grams of a saturated iodine solution (solubility of iodine in water is 0.029 grams per 100 grams), and 10.0 grams of a 10% solution of $FeCl_3$, (1.0 grams $FeCl_3$) were added to a 200 ml beaker and stirred and heated to 60° C. in a water bath. When the solution reached temperature, 38.2 grams of elemental phosphorus were added and allowed to mix for three hours at temperature. After three hours the stirring was stopped and the aqueous and phosphorus layers separated. The phosphorus was cooled to freezing (30° C.) and the aqueous phase was drawn off. The phosphorus was then washed with deionized water at 50° C. for thirty minutes and then removed. The product was analyzed and compared with the analysis of the phosphorus before the extraction.

| | |
| --- | --- |
| Analysis of phosphorus before treatment | 47 PPM antimony |
| Analysis of phosphorus after treatment | 1.8 PPM antimony |

This experiment demonstrates that the ferric chloride and iodine can be used in lower quantities than what was originally tested, by at least half in the case of ferric chloride and by almost 90 percent with the iodine.

What is claimed is:

1. A process for purifying elemental phosphorus, comprising dosing a multi-phase elemental phosphorus system, having an aqueous phase and an immiscible, elemental phosphorus phase containing antimony, with a conditioning agent selected from the group consisting of iron (II) salt and elemental iodine, iron (III) salt and elemental iodine; iron (II) iodide; elemental iodine; iron (II) sulfate; and iron (III) sulfate in an amount effective to lower the amount of antimony in the phosphorus; agitating the resultant mixture at a temperature above the melting point of phosphorus, but below the boiling point of water, then separating the aqueous phase from the phosphorus phase to recover a phosphorus lower in antimony content.

2. The process of claim 1, wherein the elemental phosphorus system is dosed with an effective amount of a conditioning agent of elemental iodine together with an iron (II) salt or an iron (III) salt.

3. The process of claim 2, wherein the elemental iodine, and the iron (II) salt or the iron (III) salt are each dosed relative to antimony in a molar ratio of 1:1 or greater, and wherein the antimony is separated from the phosphorus by gravity separation in the aqueous phase.

4. The process of claim 2, wherein the elemental iodine, and the iron (II) salt or the iron (III) salt are each dosed relative to antimony in a molar ratio of 10:1 or greater.

5. The process of claim 2, wherein the elemental iodine, and the iron (II) salt or the iron (III) salt are each dosed relative to antimony in a molar ratio of 100:1 or greater.

6. The process of claim 1, wherein the conditioning agent is iron (II) iodide.

7. The process of claim 6, wherein the iron (II) iodide is dosed in molar ratio of iron (II) iodide to antimony of 1:1 or greater.

8. The process of claim 6, wherein the iron (II) iodide is dosed in a molar ratio of iron (II) iodide to antimony is 50:1 or greater, and wherein the antimony is separated from the phosphorus by gravity separation in the aqueous phase.

9. The process of claim 7, wherein the molar ratio of iron (II) iodide to antimony is 100:1 or greater.

10. The process of claim 1, wherein the conditioning agent is elemental iodine.

11. The process of claim 10, wherein the elemental iodine is dosed at a molar ratio of iodine to antimony of 1:1 or greater, and the antimony is separated from the phosphorus by gravity separation of the aqueous phase and the phosphorus phase.

12. The process of claim 10, wherein the elemental iodine is dosed at an iodine to antimony molar ratio of 10:1 or greater.

13. The process of claim 10, wherein the elemental iodine is dosed at an iodine to antimony molar ratio of 100:1 or greater.

14. The process of claim 1, wherein the conditioning agent is iron (II) sulfate.

15. The process of claim 14, wherein the iron (II) sulfate is dosed at a molar ratio of iron (II) sulfate to antimony of 1:1 or greater; and wherein the antimony is separated from the phosphorus by gravity separation of the aqueous phase and the phosphorus phase.

16. The process of claim 15, wherein the iron (II) sulfate is dosed at a molar ratio of iron (II) sulfate to antimony of 10:1 or greater.

17. The process of claim 15, wherein the conditioning agent is iron (II) sulfate, and the elemental phosphorus is dosed with the iron (II) sulfate at a molar ratio of iron (II) sulfate to antimony of 50:1 or greater.

18. The process of claim 1, wherein the iron (III) sulfate is dosed at a molar ratio of iron (III) sulfate to antimony of at least 1:1; and wherein the antimony is separated from the phosphorus by gravity separation of the aqueous phase and the phosphorus phase.

19. The process of claim 18, wherein the iron (III) sulfate is dosed at an iron (III) sulfate to antimony molar ratio of 10:1 or greater.

20. The process of claim 18, wherein the iron (III) sulfate is dosed at an iron (III) sulfate to antimony molar ratio of 50:1 or greater.

* * * * *